(12) United States Patent
Nakanishi

(10) Patent No.: US 6,851,543 B2
(45) Date of Patent: Feb. 8, 2005

(54) CONVEYING MACHINE

(75) Inventor: Ken Nakanishi, Tokyo (JP)

(73) Assignee: NEC Corporation, Tokyo (JP)

( * ) Notice: Subject to any disclaimer, the term of this patent is extended or adjusted under 35 U.S.C. 154(b) by 39 days.

(21) Appl. No.: 10/364,968

(22) Filed: Feb. 12, 2003

(65) Prior Publication Data

US 2003/0173188 A1 Sep. 18, 2003

(30) Foreign Application Priority Data

Feb. 13, 2002 (JP) ........................................ 2002-035402

(51) Int. Cl.⁷ ............................................. B65G 47/28
(52) U.S. Cl. ................ 198/459.4; 198/467.1; 198/475.1
(58) Field of Search ................. 198/467.1, 459.4, 198/795, 475.1, 459.3

(56) References Cited

U.S. PATENT DOCUMENTS

| | | | | |
|---|---|---|---|---|
| 2,730,226 A | * | 1/1956 | Day et al. ................ | 198/459.4 |
| 2,789,683 A | * | 4/1957 | Stahl ........................ | 198/345.3 |
| 3,565,235 A | * | 2/1971 | Brown et al. ............. | 198/459.4 |
| 3,848,726 A | * | 11/1974 | Wiemer ...................... | 198/795 |
| 4,265,357 A | * | 5/1981 | Amberg et al. .......... | 198/459.4 |
| 5,878,865 A | * | 3/1999 | Bailey et al. ............ | 198/459.8 |

* cited by examiner

Primary Examiner—Richard Ridley
(74) Attorney, Agent, or Firm—Scully, Scott, Murphy & Presser

(57) ABSTRACT

There are provided linear section moving chain conveyors for moving carrier trucks on linear sections of a guide rail, curvilinear section moving chain conveyors for moving the carrier trucks on curvilinear sections of a guide rail, and conveyance interval variable portions for moving the carrier trucks on borders between the linear sections and the curvilinear sections while gradually varying the interval between the carrier trucks. When the carrier trucks are moved from a linear section to the following curvilinear section, spiral screws of the conveyance interval variable portions gradually widen the intervals between the carrier trucks, and when the carrier trucks are moved from a curvilinear section to the following linear section, the screws gradually narrow the intervals between the carrier trucks.

23 Claims, 6 Drawing Sheets

CONVEYING MACHINE

BACKGROUND OF THE INVENTION

1. Field of the Invention

The present invention relates to a conveying machine, and more particularly to a conveying machine for circulatorily moving a plurality of carrier boxes on a looped route.

2. Description of the Related Prior Art

In recent years, a conveying machine for moving a plurality of carrier boxes laden with loads to deliver the loads to prescribed gathering units to sort the loads (which may be mails, for instance) has come into use.

FIG. 1 shows a plan of a schematic configuration of a conventional conveying machine 100 (a conveying machine for mails) according to the prior art, and FIG. 2, its front view.

Referring to FIG. 1 and FIG. 2, the prior art conveying machine 100 comprises a case 10, carrier boxes 20 and a guide rail 50.

FIG. 3, shows details of section E in FIG. 1. Referring to FIG. 3, the conveying machine 100 further includes a plurality of carrier trucks 130. The guide rail 50 is installed within the case 10, and formed in a loop shape having linear sections and curvilinear sections. The carrier trucks 130, supported by the guide rail 50, circulatorily travels on the looped route. The carrier trucks 130 are linked by joints 131 to constitute a chain conveyor 160.

The case 10 comprises a plurality each of sorting cases 11 and a feeding case 12. The sorting cases 11 have a plurality of gathering units 111 for gathering loads discharged from the carrier boxes 20. The feeding case 12 has a drop unit 13 for feeding loads to the carrier boxes 20 by conveyance by a belt 14. The gathering units 111 and the drop unit 13 are arranged in the linear conveyance part of the carrier boxes 20.

FIG. 4 gives a view in the direction of arrow F in FIG. 3. Referring to FIG. 4, the carrier boxes 20 hang from the carrier trucks 130.

Next will be described the operation of the conveying machine 100 configured as explained above.

The belt 14 of the feeding case 12 individually conveys loads (which may be mails, for instance) one unit at a time to the drop unit 13. Each load is dropped by the drop unit 13 into a prescribed one of the carrier boxes 20. A drive mechanism (not shown) of the chain conveyor 160 causes the carrier boxes 20 to be conveyed at a constant speed.

The carrier boxes 20 are partitioned to provide one compartment for each mail. The carrier boxes 20 convey mails, and discharge them, classified by destination, into respectively prescribed ones of the gathering units 111 of the sorting cases 11.

As is evident from FIG. 3, the carrier boxes 20 are arranged at equal intervals (L3=L4) in the conveying machine 100 described above. For this reason, the intervals between the carrier boxes 20 should be wide enough (intervals L4) not to let adjoining carrier boxes 20 interfere with each other in curvilinear sections of the guide rail 50. Therefore, even if the intervals are kept to the necessary minimum for the carrier boxes 20 not to interfere with each other in curvilinear sections, the intervals between the carrier boxes 20 will widen in linear sections (intervals L3). As a consequence, the mounting efficiency of the carrier boxes 20 would deteriorate and the density of conveyance decrease in linear sections.

Since the number of loads handled per unit length of time depends on the speed of conveyance of the carrier trucks 130 by the chain conveyor 160, the number of loads handled can be increased by raising the speed of conveyance. However, a higher speed of conveyance than a certain level would destabilize the actions to drop and discharge loads into and out of the carrier boxes 20 being conveyed at a constant speed and thereby deteriorate the reliability of load handling.

Slowing the speed of conveyance to stabilize the load dropping and discharging actions would substantially reduce the load handling capacity per unit length of time on account of the resultant low mounting efficiency of the carrier boxes 20 in linear sections.

As described so far, the conveying machine according to the prior art is incapable of stable load handling without sacrificing the efficiency of handling because the intervals between carrier boxes widen in linear sections and the density of conveyance of carrier boxes there is reduced.

SUMMARY OF THE INVENTION

An object of the present invention, therefore, is to provide a conveying machine capable of stably performing load dropping and discharging actions without sacrificing the efficiency of load handling.

A conveying machine according to the invention comprises a guide rail having linear sections and curvilinear sections, a plurality of carrier trucks traveling with support by the guide rail, and a conveyance interval variable portion for varying the intervals between the carrier trucks, wherein the conveyance interval variable portion widens the intervals between the carrier trucks when the carrier trucks move from any of the linear sections to the curvilinear sections, and narrows the intervals between the carrier trucks when the carrier trucks move from any of the curvilinear sections to the linear sections.

In a conveying machine, which is first specific preferred embodiment of the invention, the conveyance interval variable portions can have a spiral screw of which the width of the grooves is constant and the pitch of the grooves gradually varies.

In another conveying machine, which is a second specific preferred embodiment of the invention, the conveyance interval variable portions are provided with link mechanisms for linking the carrier trucks, each of the link mechanisms has two arms rotatably fitted to one point of the carrier trucks, a joint for joining the arms of adjoining ones of the carrier trucks, a guide roller provided at the tip of each of the arms, and a truck interval adjusting guide rail for supporting the guide roller.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Figure 1:
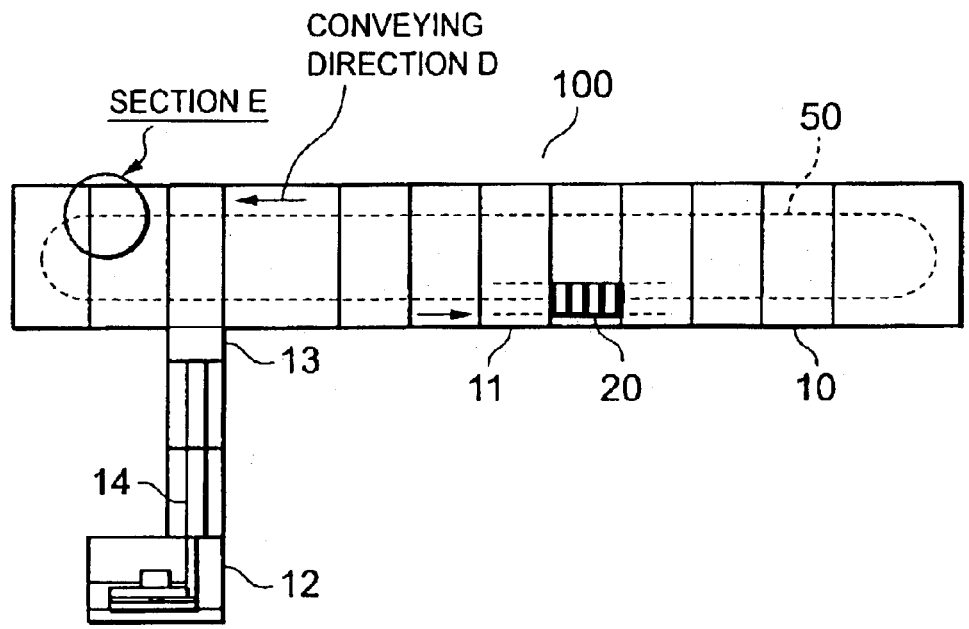
FIG. 1 shows a plan of a schematic configuration of the conveying machine according to the prior art.
Figure 2:
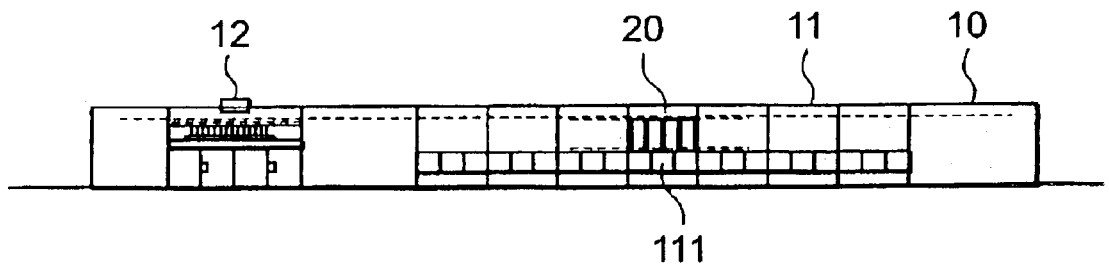
FIG. 2 shows a front view of the prior art conveying machine.
Figure 3:
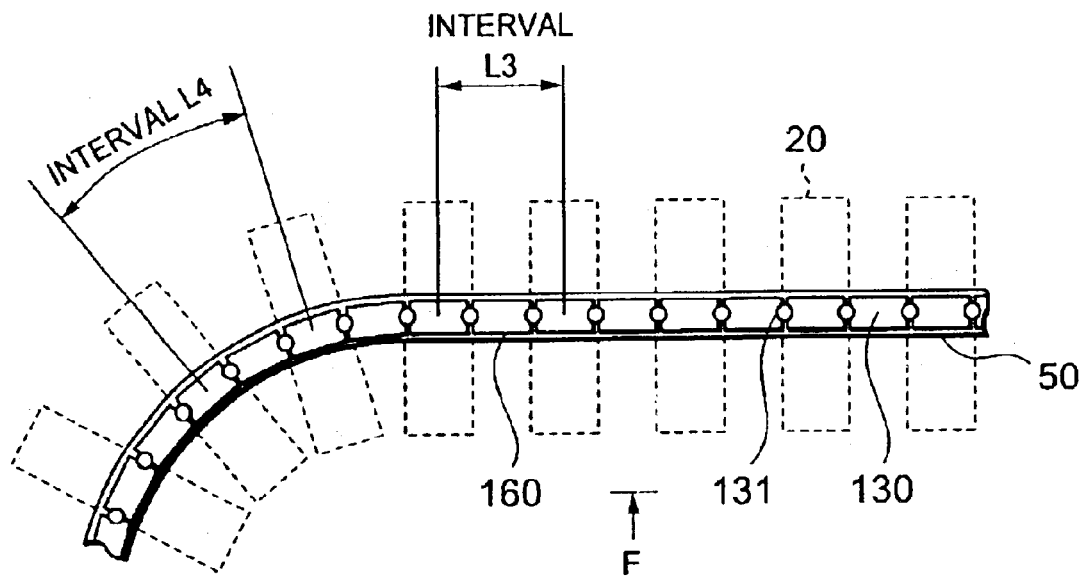
FIG. 3 shows details of section E in FIG. 1.
Figure 4:
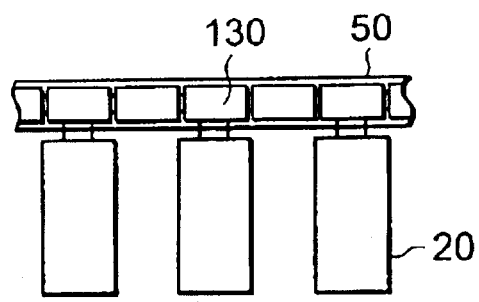
FIG. 4 gives a view in the direction of arrow F in FIG. 3.
Figure 5:
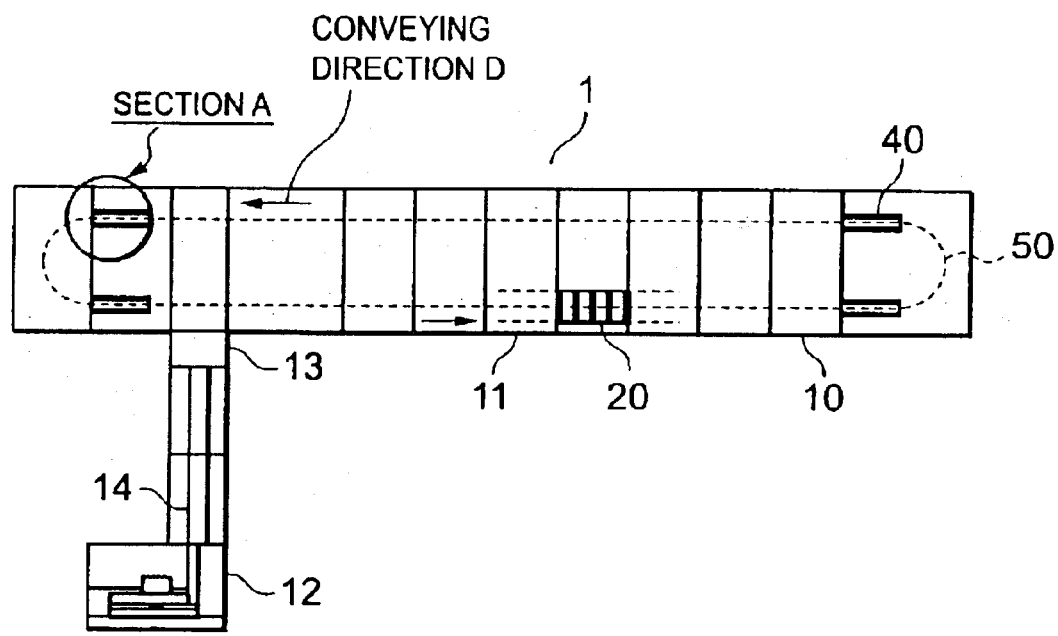
FIG. 5 shows a plan of a schematic configuration of a conveying machine, which is the first specific preferred embodiment of the invention.
Figure 6:
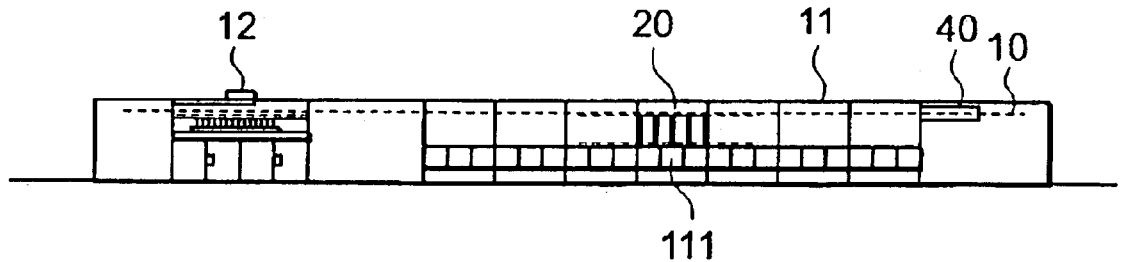
FIG. 6 shows a front view of the schematic configuration of the conveying machine, which the first specific preferred embodiment of the invention.

FIG. 5 shows a plan of a schematic configuration of a conveying machine (conveying machine for mails), which is the first specific preferred embodiment of the invention, and FIG. 6, its front view. The same constituent elements as their counterparts in the prior art conveying machine 100 shown in FIG. 1 through FIG. 4 are denoted by respectively the same reference signs.

Referring to FIG. 5 and FIG. 6, a conveying machine 1 according to the invention comprises a case 10, carrier boxes 20, conveyance interval variable portions 40 and a guide rail 50.

Figure 7:
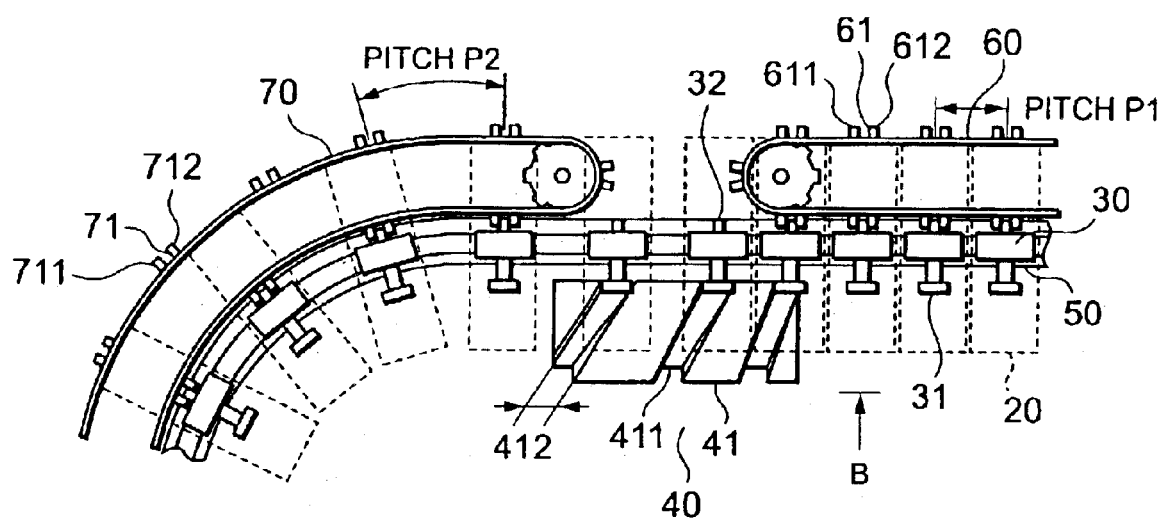
FIG. 7 shows details of section A in FIG. 5.

FIG. 7 shows details of section A in FIG. 5. Referring to FIG. 7, the conveying machine 1 further includes carrier trucks 30, linear section moving chain conveyors 60 and curvilinear section moving chain conveyors 70.

Figure 8:
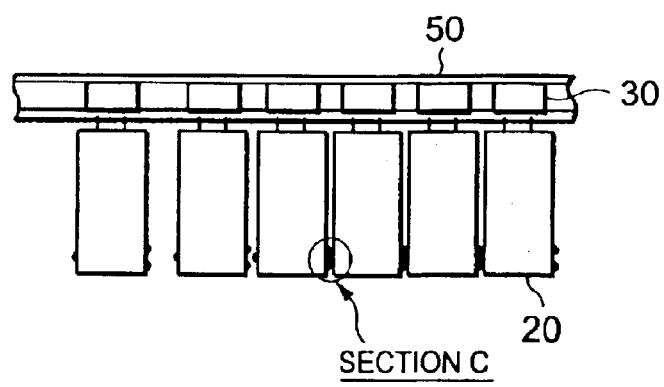
FIG. 8 gives a view in the direction of arrow B in FIG. 7.
Figure 9:
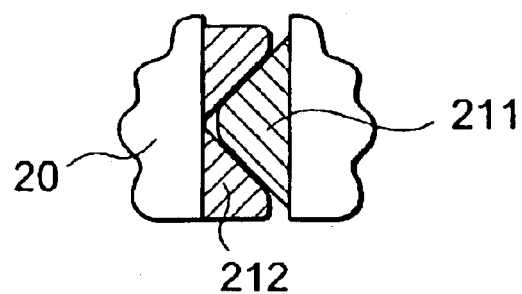
FIG. 9 shows details of section C in FIG. 8.

FIG. 8 gives a view in the direction of arrow B in FIG. 7. Referring to FIG. 8, each of the carrier boxes 20 hangs from one or another of the carrier trucks 30.

The case 10 comprises a plurality of sorting cases 11 and a feeding case 12. The sorting cases 11 include a plurality of gathering units 111 for gathering loads (mails) discharged from the carrier boxes 20. The feeding case 12 includes a drop unit 13 for feeding loads to the carrier boxes 20 by conveyance by a belt 14. The plurality of carrier trucks 30, supported by the guide rail 50, circulatorily travel on the looped route. Each of the conveyance interval variable portions 40 includes a spiral screw 41 for moving the carrier trucks 30 while varying the intervals between them. The guide rail 50 is installed within the case 10, and formed in a loop shape having linear sections and curvilinear sections. The usual shape of the guide rail 50, as shown in FIG. 5, is like s racing track consisting of two semi circles linked by two straight lines. The linear section moving chain conveyors 60 move the carrier trucks 30 in the linear sections of the guide rail 50. The curvilinear section moving chain conveyors 70 move the carrier trucks 30 in the curvilinear sections of the guide rail 50.

The linear section moving chain conveyors 60 and the curvilinear section moving chain conveyors 70 are arranged in two positions each. The spiral screw 41 of the conveyance interval variable portions 40 are provided in four positions, in each of which a linear section and a curvilinear section of the guide rail 50 border on each other. Each of the linear section moving chain conveyors 60 has a plurality of first guides 61 formed of two projections 611 and 612. Each of the curvilinear section moving chain conveyors 70 has a plurality of second guides 71 formed of two projections 711 and 712. The first guides 61 and the second guides 71 are formed at an equal interval pitch each, and the pitch P1 of the first guides 61 is shorter than the pitch P2 of the second guides 71. The spiral screw 41 of the conveyance interval variable portions 40 is so configured that the width 412 of their grooves 411 are constant and the pitch of the grooves gradually varies. Each of the carrier trucks 30 is provided with a first hold 31 and a second hold 32 on the two sides orthogonal to the conveying direction D. In the linear sections of the guide rail 50, the first guides 61 and the first hold 31 engage with each other. In the curvilinear sections of the guide rail 50, the second guides 71 and the first hold 31 engage with each other. On the border between each linear section and each curvilinear section, the grooves 411 of the spiral screw 41 and the second hold 32 engage with each other. Each of the carrier boxes 20 is provided with a coupling guide 211 forward and a coupling guide 212 backward in the conveying direction D. The coupling guide 211 and the coupling guide 212 are formed of elastic members in such a shape as regulates the relative oscillation of adjoining carrier boxes 20.

Next will be described the operation of the conveying machine 1 configured as described above.

The belt 14 of the feeding case 12 individually conveys loads (mails) one unit at a time to the drop unit 13. Each load is dropped by the drop unit 13 into a prescribed one of the carrier boxes 20. Te carrier boxes 20 are conveyed by the linear section moving chain conveyors 60 in the linear sections, by the curvilinear section moving chain conveyors 70 in the curvilinear sections, and by the spiral screw 41 on the border between each linear section and each curvilinear section.

The carrier boxes 20 are partitioned to provide one compartment for each mail. Mails conveyed in the carrier boxes 20 are classified by destination, and discharged into respectively prescribed ones of the gathering units 111 of the sorting cases 11.

The actions that take place when the carrier boxes 20 hanging from the carrier trucks 30 shift from a linear section to a curvilinear section and vice versa will now be described in detail.

Referring to FIG. 7, the linear section moving chain conveyors 60 convey the carrier boxes 20 in the linear section. When a carrier box 20 reaches aborter between the linear section and the curvilinear section that follows, the first guide 61 of the linear section moving chain conveyor 60 and the first hold 31 of the carrier truck 30 are disengaged from each other. The carrier truck 30 transfers from the linear section moving chain conveyor 60 to a spiral screw 41 and the second hold 32 engages with the groove 411 of the spiral screw 41. The rotation of the spiral screw 41 causes the carrier truck 30 to travel. As the pitch of the groove 411 of the spiral screw 41 gradually widens, the carrier truck 30 travels while gradually widening the intervals so that it can be synchronized with the pitch P2 of the second guide 71 of the curvilinear section moving chain conveyor 70 at the end of the spiral screw 41 toward the curvilinear section. In the section of transfer from the spiral screw 41 to the curvilinear section moving chain conveyor 70, the groove 411 of the spiral screw 41 and the second hold 32 are disengaged from each other, and the second guide 71 and the first hold 31 engage with each other. After that, the curvilinear section moving chain conveyor 70 conveys the carrier truck 30 along the curvilinear section.

Though not illustrated, when a carrier truck 30 travels from a curvilinear section to the next linear section, the second guide 71 and the first hold 31 are disengaged from each other on the border between the curvilinear section and the linear section, and the carrier truck 30 transfers to a spiral screw 41. The second hold 32 engages with the groove 411 of the spiral screw 41, and the carrier truck 30 is moved by the rotation of the spiral screw 41. The carrier truck 30 travels while gradually narrowing the intervals so that it can be synchronized with the pitch P1 of the first guide 61 of the linear section moving chain conveyor 60 at the end of the spiral screw 41 toward the linear section. In the section of transfer to the linear section, the groove 411 of the spiral screw 41 and the second hold 32 are disengaged from each other, the first hold 31 and the first guide 61 engage with each other, and the linear section moving chain conveyor 60 conveys the carrier truck 30 along the linear section.

In the section where the carrier trucks 30 transfer from the linear section moving chain conveyor 60 to the spiral screw 41, the speed of conveyance of the carrier trucks 30 by the linear section moving chain conveyor 60 is equalized to the speed of conveyance of the carrier trucks 30 by the spiral screw 41. In order to equalize the two speeds, gears of a prescribed ratio (not shown) or a timing belt (not shown) couple the rotational shaft of each spiral screw 41 and the sprocket wheel shaft of each linear section moving chain conveyor 60 to each other.

Similarly where a carrier truck 30 transfers from the spiral screw 41 to the curvilinear section moving chain conveyor 70, the rotational shaft of each spiral screw 41 and the sprocket wheel shaft driving each linear section moving chain conveyor 60 are coupled by gears of a prescribed ratio (not shown) or a timing belt (not shown) so as to equalize the speed of conveyance of the curvilinear section moving chain conveyor 70 and that of the spiral screw 41.

Figure 10:
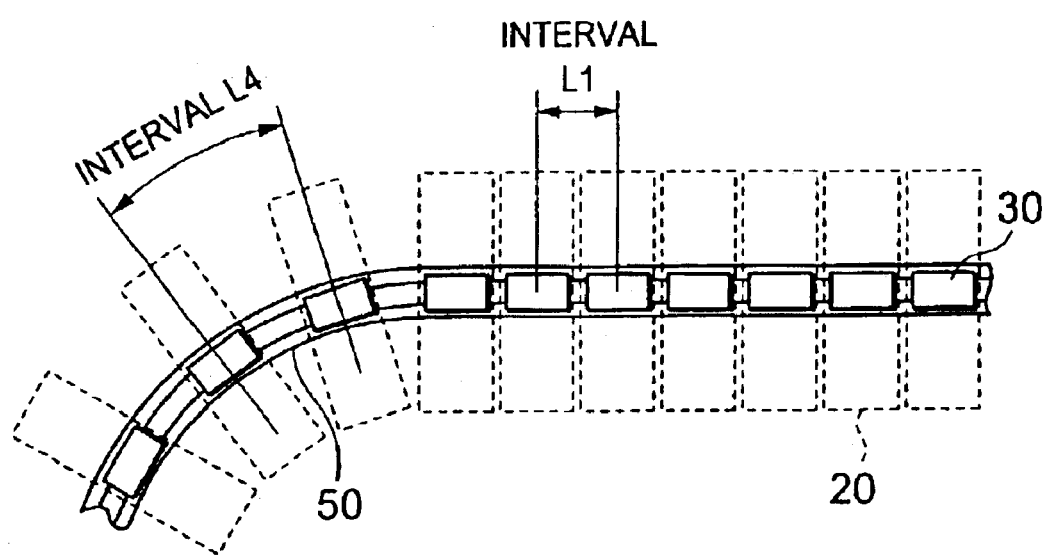
FIG. 10 is a diagram for explaining the intervals of conveyance.

As described above, the conveying machine 1 according to the present invention is provided with the conveyance interval variable portions 40 which gradually vary the intervals between the carrier boxes 20 on four borders between the linear sections and the curvilinear sections of a looped route. The conveyance interval variable portions 40 set the conveyance intervals (intervals L1 in FIG. 10) of the carrier boxes 20 in the linear sections to be narrower than the minimum conveyance intervals at which the carrier boxes 20 do not interfere with each other in the curvilinear sections (intervals L2 in FIG. 10). This arrangement serves to increase the mounting density of the carrier boxes 20 in the linear sections and to keep the speed of conveyance in the linear sections to the necessary minimum. This results in the advantage of enabling the actions to drop and discharge loads to be performed stably without sacrificing the load handling capacity.

Figure 11:
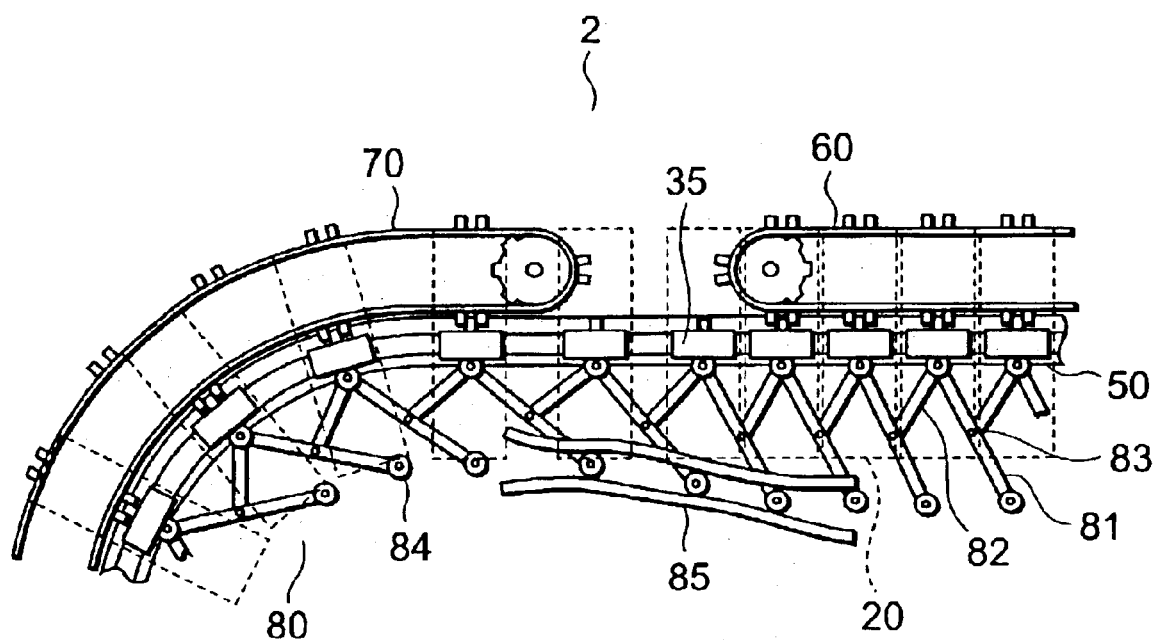
FIG. 11 shows a plan of a schematic configuration of a conveying machine, which is the second specific preferred embodiment of the invention.

Next will be described a conveying machine, which is the second specific preferred embodiment of the present invention with reference to a drawing. FIG. 11 shows a plan of a schematic configuration of the conveying machine 2, which is the second specific preferred embodiment of the invention. The same constituent elements as their counterparts in the conveying machine 1 in the first mode of implementing the invention are denoted by respectively the same reference signs.

The conveying machine 2, which is the second specific embodiment, differs from the conveying machine 1, which is the first specific embodiment, in that link mechanisms 80 are provided in place of the spiral screws 41 as conveyance interval variable portions 40. The following description will mainly focus on the difference.

The conveying machine 2 has the link mechanisms 80 for linking carrier trucks 35. Each of the link mechanisms 80 comprises a first arm 81, a second arm 82, a joint 83, a guide roller 84 and a truck interval adjusting guide rail 85. The first arm 81 and the second arm 82 are fitted to a side of the carrier truck 35 to be rotatable around a common shaft. The joint 83, as shown in FIG. 11, joins the first arm 81 of the carrier truck 35 to the second arm 82 of the adjoining carrier truck 35. The first arm 81 has at its tip the guide roller 84. The truck interval adjusting guide rail 85 support the guide rollers 84 and are arranged not in parallel to the guide rail 50. The truck interval adjusting guide rail 85 are provided on the (four) borders between the linear sections and the curvilinear sections of the guide rail 50.

Since the guide rollers 84 are restrained within the truck interval adjusting guide rail 85 which are not in parallel to the guide rail 50, the actions of the link mechanisms 80 widen sometimes and narrow at other times the intervals between the carrier trucks 35.

Therefore, it can make the conveyance intervals of the carrier boxes 20 in the linear sections narrower than those of the carrier boxes 20 in the curvilinear sections, and thereby enhance the mounting density of the carrier boxes 20 in the linear sections.

Incidentally, in the first and second specific embodiments, a timing belt conveyor can be used in place of a chain conveyor as the conveyor as such.

As hitherto described, since the conveying machines according to the present invention permit slowing the speed of carrier boxes in linear sections, the load dropping action in the drop unit and the load discharging action in the gathering units can be stably performed without sacrificing the efficiency of load handling.

Moreover, the load handling capacity per unit length of time can be improved in the conveyance of carrier boxes by the linear section moving chain conveyors at the same speed.

Furthermore, where the length of time required for discharging is constant, the size of the conveying machine can be reduced by the traveling distance of each carrier box, which corresponds to the product of multiplication of the difference from the prior art conveying machine in the speed of conveyance by the length of time required.

While the present invention has been described with reference to certain preferred embodiments thereof, it is to be understood that the subject matter encompassed by the invention is not limited to those specific embodiments. Instead, it is intended to include all such alternatives, modifications, and equivalents as can be included within the spirit and scope of the following claims.

What is claimed is:

1. A conveying machine comprising:
   a looped guide rail having linear sections and curvilinear sections,
   a plurality of carrier trucks traveling with support by said guide rail,
   carrier boxes fitted to said carrier trucks,
   a conveyor for moving said carrier trucks, and
   a conveyance interval variable portion for varying the intervals between said carrier trucks, wherein:
   said conveyance interval variable portion widens the intervals between said carrier trucks when said carrier trucks move from said linear sections to said curvilinear sections, and narrows the intervals between said carrier trucks when said carrier trucks move from said curvilinear sections to said linear sections, and
   said conveyor comprises linear section moving conveyors for moving said carrier trucks in said linear sections and curvilinear section moving conveyors for moving said carrier trucks in said curvilinear sections,
   said linear section moving conveyors have a plurality of first guides for guiding said carrier trucks, and said curvilinear section moving conveyors have a plurality of second guides for guiding said carrier trucks.

2. The conveying machine, as claimed in claim 1, wherein:
said conveyor is a chain conveyor.

3. The conveying machine, as claimed in claim 1, wherein:
said conveyor is a belt conveyor.

4. The conveying machine, as claimed in claim 1, wherein:
said first guides and said second guides are formed at an equal interval pitch each, and
the pitch of said first guides is smaller than the pitch of said second guides.

5. The conveying machine, as claimed in claim 1, wherein:
each of said carrier trucks has a first hold and a second hold on the two sides orthogonal to the conveying direction,
said first guides and said first hold engage with each other in said linear sections,
said second guides and said first hold engage with each other in said curvilinear sections, and
said conveyance interval variable portions and said second hold engage with each other on the borders between said linear sections and said curvilinear sections.

6. The conveying machine, as claimed in claim 5, wherein: said conveyance interval variable portions have a spiral screw of which the width of the grooves are constant and the pitch of the grooves gradually varies.

7. The conveying machine, as claimed in claim 6, wherein:
said carrier trucks are moved by engaging the grooves of said spiral screw with said second hold and rotating said spiral screw.

8. The conveying machine, as claimed in claim 1, wherein:
each of said carrier boxes has coupling guides, one forward and the other backward in the traveling direction.

9. The conveying machine, as claimed in claim 8, wherein:
each of said coupling guides has a means of regulating the relative oscillation of adjoining ones of said carrier boxes.

10. The conveying machine, as claimed in claim 1, further provided with:
a plurality of sorting portions and a feeding portion having a drop unit for feeding loads to said carrier boxes by conveyance by a belt, and
each of said sorting portions has a plurality of gathering units for gathering said loads discharged from said carrier boxes.

11. The conveying machine, as claimed in claim 10, wherein:
said drop unit and said gathering units are provided in said linear sections.

12. The conveying machine, as claimed in claim 10, wherein:
said loads are mails.

13. The conveying machine, as claimed in claim 1, wherein:
said loop shape consists of two semicircles linked by two straight lines.

14. The conveying machine, as claimed in claim 6, wherein:
when any of said carrier trucks travels from one of said linear sections to said curvilinear section that follows,
said first guides and said first hold are disengaged from each other, the grooves of said spiral screw and said second hold engage with each other,
said carrier trucks travel while the intervals between them gradually widen to become equal to the pitch of said second guides,
after the grooves of said spiral screw and said second hold become disengaged from each other,
said second guides and said first hold engage with each other to convey said carrier trucks along said curvilinear section,
when said carrier trucks travel from said curvilinear section to said linear section that follows,
said second guides and said first hold become disengaged from each other and the grooves of said spiral screw and said second hold engage with each other,
said carrier trucks travel while the intervals between them gradually narrow to become equal to the pitch of said first guides and,
after the grooves of said spiral screw and said second hold become disengaged from each other,
said first guides and said first hold engage with each other to convey said carrier trucks along said linear section.

15. The conveying machine, as claimed in claim 14, further provided with:
means of synchronizing the traveling speed of said carrier trucks in the positions where said carrier trucks transfer from one of said linear section moving conveyors to said conveyance interval variable portion that follows and in the positions where said carrier trucks transfer from one of said conveyance interval variable portions to said curvilinear section moving conveyor that follows.

16. A conveying machine comprising:
a looped guide rail having linear sections and curvilinear sections,
a plurality of carrier trucks traveling with support by said guide rail,
carrier boxes fitted to said carrier trucks,
a conveyor for moving said carrier trucks, and
a conveyance interval variable portion for varying the intervals between said carrier trucks, wherein:
said conveyance interval variable portion widens the intervals between said carrier trucks when said carrier trucks move from said linear sections to said curvilinear sections, and narrows the intervals between said carrier trucks when said carrier trucks move from said curvilinear sections to said linear sections, and
said conveyance interval variable portions are provided with link mechanisms for linking said carrier trucks,
each of said link mechanisms has two arms rotatably fitted to one point of said carrier trucks, a joint for joining said arms of adjoining ones of said carrier trucks, a guide roller provided at the tip of each of said arms, and a truck interval adjusting guide rail for supporting said guide roller.

17. The conveying machine, as claimed in claim 16, wherein: said truck interval adjusting guide rail is arranged non parallel to said guide rail.

18. The conveying machine, as claimed in claim 16, wherein:

each of said carrier boxes has coupling guides, one forward and the other backward in the traveling direction.

19. The conveying machine, as claimed in claim 18, wherein:

each of said coupling guides has a means of regulating the relative oscillation of adjoining ones of said carrier boxes.

20. The conveying machine, as claimed in claim 16, further provided with:

a plurality of sorting portions and a feeding portion having a drop unit for feeding loads to said carrier boxes by conveyance by a belt, and each of said sorting portions has a plurality of gathering units for gathering said loads discharged from said carrier boxes.

21. The conveying machine, as claimed in claim 20, wherein: said loads are mails.

22. The conveying machine, as claimed in claim 20, wherein: said drop unit and said gathering units are provided in said linear sections.

23. The conveying machine, as claimed in claim 16, wherein: said loop shape consists of two semicircles linked by two straight lines.

* * * * *